(No Model.)
V. F. PRENTICE.
MANDREL.
No. 582,225. Patented May 11, 1897.
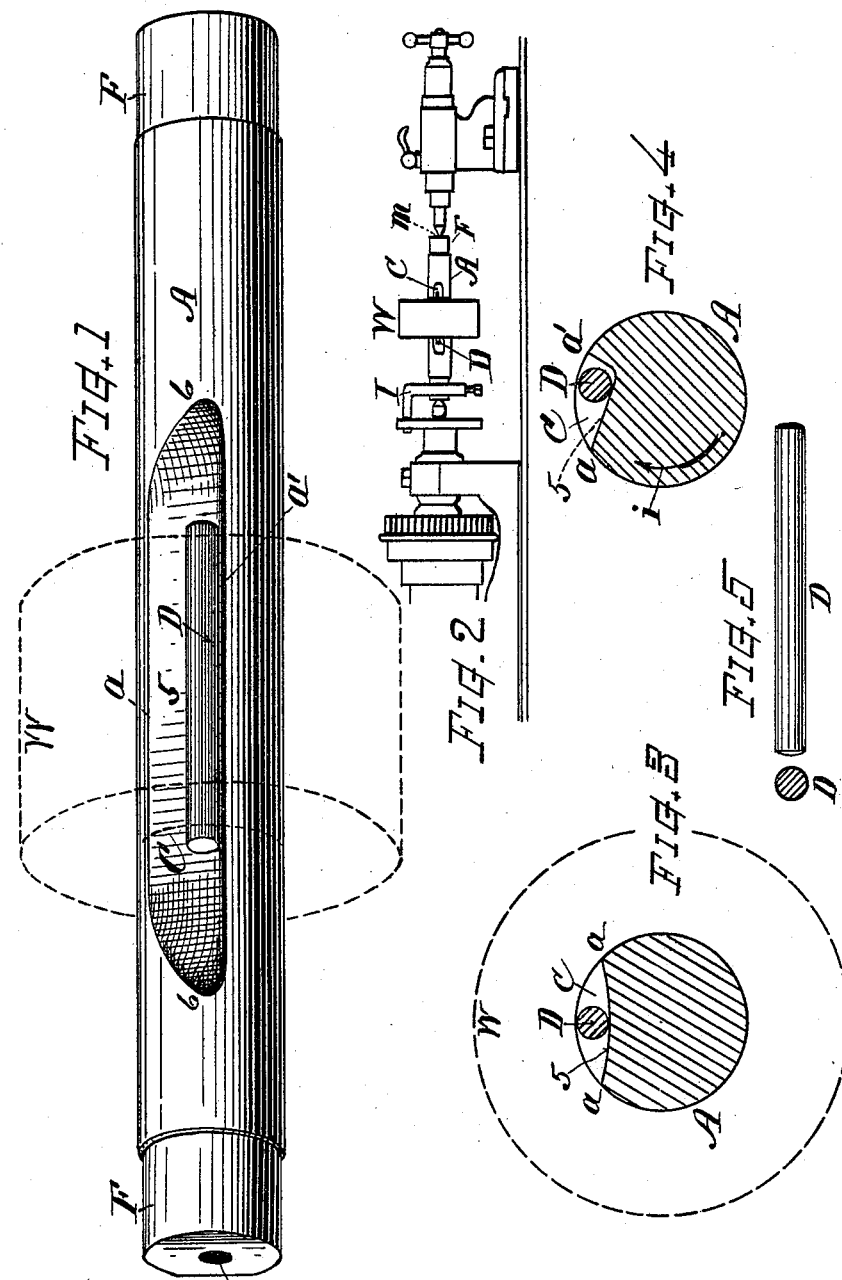
Witnesses.
Inventor.
Vernon F. Prentice
By Chas. H. Burleigh
Attorney

UNITED STATES PATENT OFFICE.

VERNON F. PRENTICE, OF WORCESTER, MASSACHUSETTS.

MANDREL.

SPECIFICATION forming part of Letters Patent No. 582,225, dated May 11, 1897.

Application filed March 10, 1896. Serial No. 582,675. (No model.)

*To all whom it may concern:*

Be it known that I, VERNON F. PRENTICE, a citizen of the United States, residing at Worcester, in the county of Worcester and State of Massachusetts, have invented a new and useful Mandrel, of which the following, together with the accompanying drawings, is a specification sufficiently full, clear, and exact to enable persons skilled in the art to which this invention appertains to make and use the same.

The object of the present invention is to provide a mandrel or arbor for lathework or for supporting machine parts while being turned or dressed off in the operations of manufacture, which mandrel can be readily introduced and removed from the work and which will securely and firmly hold the work while undergoing the turning and dressing-off operations in the lathe. This object I attain by a mandrel of the peculiar construction described, and illustrated in the drawings, wherein—

Figure 1 is a perspective view of my improved mandrel. Fig. 2 is a view showing the mandrel and work as supported in a lathe. Figs. 3 and 4 are transverse sections of the mandrel, respectively showing the two forms of recess; and Fig. 5 shows a side and section view of the key-rod.

My improved mandrel consists of a cylindrical shaft or body-bar A, of the required size and length, having in the side thereof a recess or milled-out space C, of the form in cross-section substantially as shown in Fig. 3 or Fig. 4 and extending a portion of the length of the mandrel, the bottom of the recess presenting a flat or slightly-concaved surface 5, transversely inclined to the cylindric surface at $a$ and extending across or preferably formed with an abrupt shoulder, as at $a'$, Fig. 4, the surface and shoulder being longitudinally parallel with the axis of the mandrel, except at the ends 6 of the recess, where it is curved upward to run out of the body. For use as a key or grip within this recess C, I provide a straight cylindrical rod or wire bar D, the diameter of which is slightly less than the radial dimension or space of the cavity-section at its point of greatest depth below the circumferential circle of the mandrel-body. Said rod is loose and free to move in the space and finds its bearing between the surface 5 and the interior of the work or machine part placed upon the mandrel for being turned off upon its exterior, the rod automatically wedging between the surfaces.

The recess or cavity C can be formed in cross-section either as shown in Fig. 3 or as in Fig. 4, the result being similar in each, excepting that a mandrel recessed as in Fig. 4 will hold in one direction of rotation and yield its hold in the other direction of rotation, while a mandrel recessed as in Fig. 3 will hold in both directions of rotation and yield only at a limited central interval between the opposite rotations.

The ends F F of the mandrel are of the usual form for the attachment thereto of the lathe-dog I at either end and are fitted with center holes $m$ for support on the points of the lathe-centers in usual manner.

This mandrel is inserted in the work W with an easy fit, but without driving or forcing it in, as is required in the use of ordinary mandrels, and the work is arranged thereon over the rod D. The mandrel can thus be readily introduced and removed. When in the lathe, the rotative action of the mandrel in the direction indicated at $i$ and the resistance of the cutting-tool exerted on the work in opposite direction cause the rod D to roll backward and take bearing between the surface 5 and interior surface of the work, thereby locking the work rigidly to the mandrel and retaining it so locked while the turning operation is in progress. When the rotative strain is reversed, the rod releases itself and the work can be easily slipped off from the mandrel.

This mandrel will hold work in an efficient manner that cannot be held upon an ordinary mandrel or work that has heretofore required a chuck for holding it securely. Hence with my mandrel many pieces of work can be more advantageously presented for turning and finish, as there is nothing to interfere with the turning of the full surface of the piece and the piece does not require to be removed and shifted in position during the operation of turning off or finishing, as is the case with work held in a chuck. The work is securely locked to the mandrel, so that there is no liability of its slipping under heavy turning and no liability of the mandrel becoming stuck or self-welded into the piece of work so that it cannot be removed, as sometimes occurs with the ordinary mandrels.

What I claim as of my invention, and desire to secure by Letters Patent, is—

1. The within-described work-supporting mandrel for turning lathework, consisting of the cylindrical body having in one side thereof a cavity, space, or recess presenting a flat or slightly-curved bottom surface longitudinally parallel with the axis and transversely inclined to the cylindrical surface as shown, and adapted for the reception of a loose rod, approximating in diameter the radial dimension of said cavity at its greatest depth, to be introduced between said inclined surface and the interior of work when mounted on said mandrel, substantially as set forth.

2. A mandrel for lathework or turning operations, consisting of a plain cylindrical shaft fitted with center holes and dog-attaching facets at its ends and having in the side thereof a cut-away space or recess presenting a transversely flat or slightly-curved bottom inclined to the cylindrical surface, as at $a$, and with an abrupt radial shoulder $a'$ longitudinally parallel with the axis, in combination with a cylindrical rod the diameter of which is slightly less than the maximum depth of the recess, said rod loosely disposed within said cavity adjacent to said shoulder, and in parallel relation to the surfaces, as set forth.

Witness my hand this 6th day of March, 1896.

VERNON F. PRENTICE.

Witnesses:
CHAS. H. BURLEIGH,
CHARLES S. BACON.